US012542268B2

(12) United States Patent
Bretschneider

(10) Patent No.: US 12,542,268 B2
(45) Date of Patent: Feb. 3, 2026

(54) CATHODE-RAY TUBE ULTRAVIOLET LIGHT SOURCE

(71) Applicant: Eric C. Bretschneider, Flower Mound, TX (US)

(72) Inventor: Eric C. Bretschneider, Flower Mound, TX (US)

( * ) Notice: Subject to any disclaimer, the term of this patent is extended or adjusted under 35 U.S.C. 154(b) by 8 days.

(21) Appl. No.: 18/688,346

(22) PCT Filed: Aug. 31, 2022

(86) PCT No.: PCT/US2022/042265
§ 371 (c)(1),
(2) Date: Feb. 29, 2024

(87) PCT Pub. No.: WO2023/034455
PCT Pub. Date: Mar. 9, 2023

(65) Prior Publication Data

US 2024/0363326 A1 Oct. 31, 2024

Related U.S. Application Data

(60) Provisional application No. 63/239,196, filed on Aug. 31, 2021.

(51) Int. Cl.
*H01J 63/06* (2006.01)
*H01J 61/02* (2006.01)

(52) U.S. Cl.
CPC ............ *H01J 63/06* (2013.01); *H01J 61/025* (2013.01); *H01J 2893/0031* (2013.01)

(58) Field of Classification Search
CPC ... H01J 63/06; H01J 61/025; H01J 2893/0031
See application file for complete search history.

(56) References Cited

U.S. PATENT DOCUMENTS

| | | | | |
|---|---|---|---|---|
| 3,519,742 A | | 7/1970 | Bjelland | |
| 3,891,886 A | | 6/1975 | Woontner | |
| 5,440,200 A | * | 8/1995 | Ozawa | H01J 63/06 313/496 |
| 6,614,161 B1 | * | 9/2003 | Jacobsen | H01J 61/42 313/506 |

(Continued)

OTHER PUBLICATIONS

Patent Cooperation Treaty PCT International Search Report Dated Dec. 9, 2022 For International Application No. PCT/US2022/042265.

(Continued)

*Primary Examiner* — Kevin Quarterman
(74) *Attorney, Agent, or Firm* — TIPS Group

(57) ABSTRACT

A cathode-ray ultraviolet light source comprising: an elongated glass envelope having a first end and second end, the glass envelope defining an evacuated volume; an electron gun positioned within the evacuated volume proximate to the first end and being capable of developing an electron beam; a target disposed within the evacuated volume between the first and second end of the glass envelope, the target comprising a phosphor material covered with a reflective metal film; and an electron beam focusing and deflecting mechanism disposed within the evacuated volume between the electron gun and the target to direct the electron beam towards the reflective metal film of the target.

16 Claims, 6 Drawing Sheets

(56) References Cited

U.S. PATENT DOCUMENTS

| | | | | |
|---|---|---|---|---|
| 7,315,114 | B2 | 1/2008 | Nishikawa et al. | |
| 8,282,243 | B2 | 10/2012 | Uemoto et al. | |
| 2004/0140432 | A1 | 7/2004 | Maldonado et al. | |
| 2005/0110384 | A1 | 5/2005 | Peterson | |
| 2008/0185970 | A1* | 8/2008 | Hunt | H01J 61/56 315/169.1 |
| 2010/0097004 | A1* | 4/2010 | Herring | H01J 61/56 315/246 |
| 2011/0079712 | A1* | 4/2011 | Kawata | G01Q 60/20 250/311 |
| 2012/0241651 | A1* | 9/2012 | Matsumoto | H01J 1/63 977/950 |
| 2018/0358197 | A1* | 12/2018 | Hu | H01J 35/101 |

OTHER PUBLICATIONS

Patent Cooperation Treaty PCT International Preliminary Report on Patenatability Dated Jun. 13, 2024 For International Application No. PCT/US2022/042265.

* cited by examiner

CATHODE-RAY TUBE ULTRAVIOLET LIGHT SOURCE

BACKGROUND

Ultraviolet (UV) light is a form of electromagnetic radiation with wavelengths from about 10 nanometers (nm) to 400 nm. UV light has a shorter wavelength than visible light, but longer than X-rays. Short wave ultraviolet light damages DNA and sterilizes surfaces with which it comes into contact. For humans, suntan and sunburn are familiar effects of exposure of the skin to UV light, along with increased risk of skin cancer.

There are no natural sources of UV light below about 280 nm due to atmospheric absorption. This includes the UVC spectrum of 190 nm to 280 nm, which can be used for disinfection because UVC light is strongly absorbed by nucleic acids which can damage DNA and RNA. However, since mammalian DNA is confined to the nucleus of cells, proteins in the cell's cytoplasm effectively shield mammalian nucleus DNA from <230 nm UV light. Therefore, a UVC light source with a wavelength from 190-230 nm is effective at sterilizing surfaces without posing a danger to humans in the vicinity. Below 190 nm a UV light would produce significant amounts of ozone, which have been known to have deleterious effects on humans.

Due to atmospheric absorption of light below about 280 nm, this portion of the spectrum is also known as the solar blind spectrum. Due to atmospheric absorption UV light with a wavelength <280 nm has a limited range of transmission and is also efficiently scattered by aerosols and molecules in air. Because of these factors, light with a wavelength <280 nm may also be used for non-line of sight (NLOS) covert communication systems.

Low pressure mercury vapor lamps have been used to produce UVC light for sterilization. Such lamps are energy efficient and cost effective but suffer from their use of mercury, which is an environmental hazard and can be toxic to humans. There has been a movement away from the use of low pressure mercury vapor lamps in recent years due to environmental and health concerns.

Light Emitting Diodes have also been used to produce UVC light. While they do not include mercury or other heavy metals, they are not very efficient and are relative low capacity compared to other UVC light technologies.

Pulsed Xenon lamps produce a wide spectrum of UV light but are relatively expensive compared to other technologies. Since the spectrum of UV is so wide, the output of the lamps need to be filtered to attenuate wavelengths outside of the 190-230 nm range.

These and other limitations of the prior art will become apparent to those of skill in the art upon a reading of the following descriptions and a study of the several figures of the drawing.

SUMMARY

A cathode-ray ultraviolet light source includes: an elongated glass envelope having a first end and second end, the glass envelope defining an evacuated volume; an electron gun positioned within the evacuated volume proximate to the first end and being capable of developing an electron beam; a target disposed within the evacuated volume between the first and second end of the glass envelope, the target comprising a phosphor material covered with a reflective metal film; and an electron beam focusing and deflecting mechanism disposed within the evacuated volume between the electron gun and the target to direct the electron beam towards the reflective metal film of the target.

A method for operating a cathode-ray tube ultraviolet light source includes directing an electron beam to reflective metal film covering a phosphor in an evacuated glass envelope and emitting ultraviolet light from the phosphor the glass envelope. In an embodiment, the electron beam is focused and steered across the reflective metal film in a pattern.

Advantages of various embodiments are that UVC light can be produced in an efficient, cost-effective manner without the use of dangerous and environmentally unfriendly heavy metals such as mercury.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
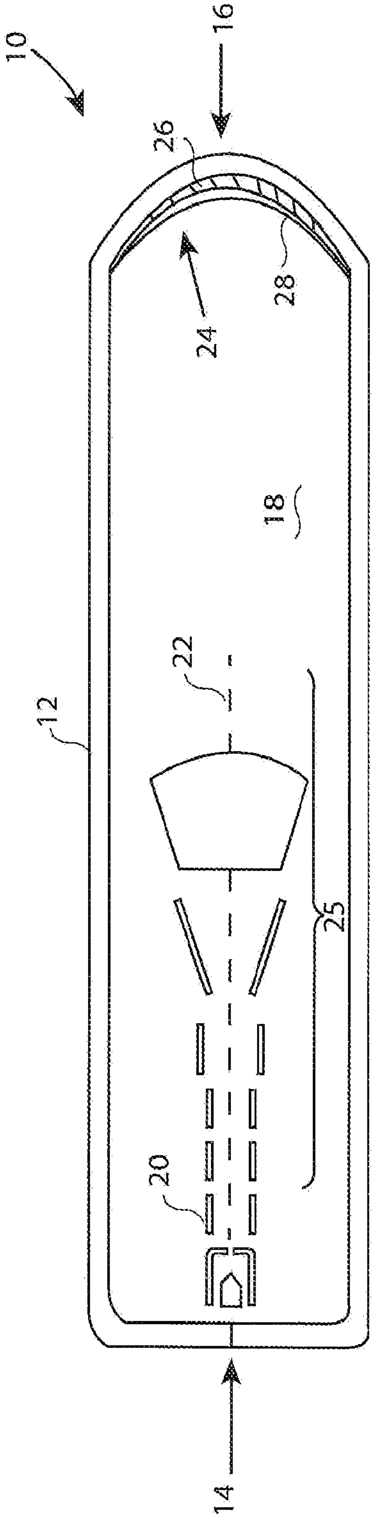
FIG. 1 is an illustration of a first example cathode-ray ultraviolet light source.

FIG. 1 is an illustration of a first example cathode-ray ultraviolet light source 10 including an elongated glass envelope 12 having a first end 14 and a second end 16 and defining an evacuated volume 18. An electron gun 20 is positioned within the evacuated volume 18 near the first end 14 and is capable of developing an electron beam 22. A target 24 is disposed within the evacuated volume 18 between the first end 14 and the second end 16 of the glass envelope 12. An electron beam focusing and deflecting mechanism 25 is used to focus the electron beam 22 and to steer the beam across the surface of the target 24.

In this example, a target 24 is disposed within the evacuated volume 18 proximate the second end 16 of the glass envelope 12. The target 24 includes a phosphor material 26 covered with a reflective metal film 28. When the electron beam 22 impinges upon the reflective metal film 28, it penetrates the film and causes the phosphor material 26 to emit ultraviolet (UV) light from the second end 16 of the glass envelope 12 with relatively little internal loss due to the reflective film 28.

Figure 2:
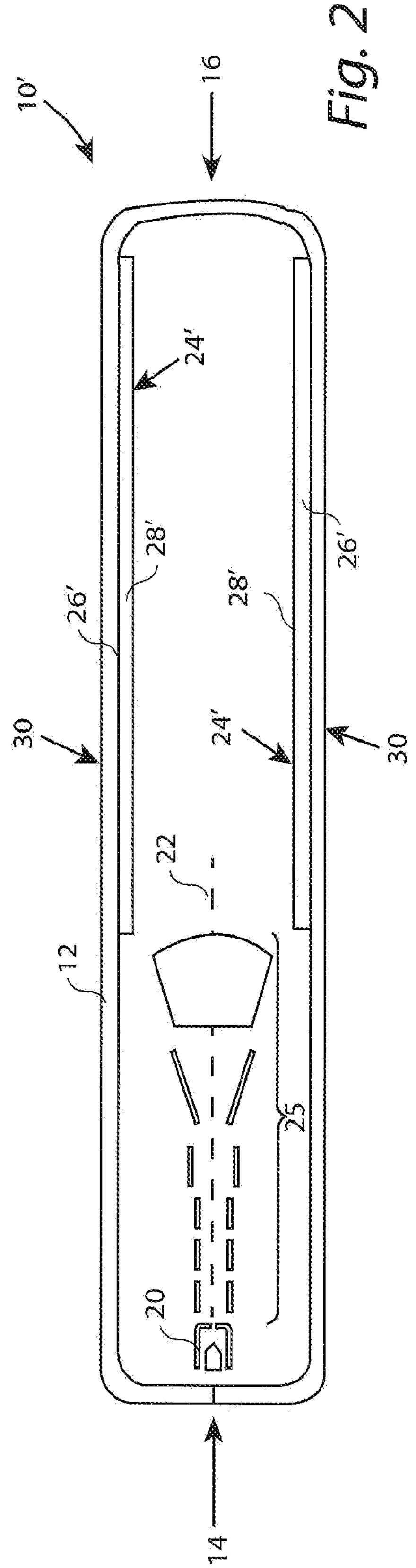
FIG. 2 is an illustration of a second example cathode-ray ultraviolet light source.

FIG. 2 is an illustration of a second example cathode-ray ultraviolet light source 10' which is similar to the first example of FIG. 1 with the exception of the target 24' configuration and location, where like reference numerals refer to like components, portions or elements. In this example, the target 24' is provided upon one or more side portions 30 of the glass envelope 12. The targets 24' include phosphor materials 26' covered with reflective metal films 28'. When the electron beam 22 impinges upon the reflective metal films 28' under the influence of the deflecting mechanism 25, it penetrates the film to cause the phosphor material 26' to emit UV light from the side portions 30 of the glass envelope 12 with relatively little internal loss due to the reflective film 28'.

Figure 3:
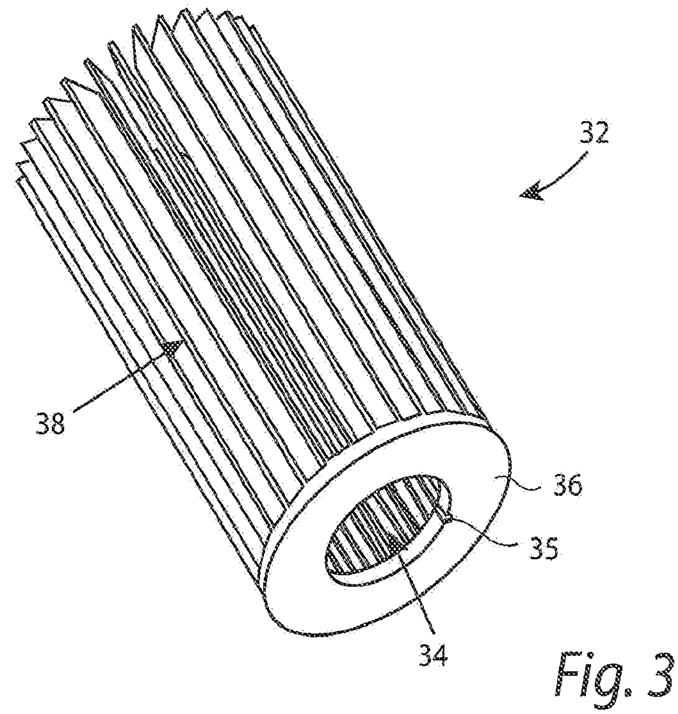
FIG. 3 is a perspective view of a beam shaper.
Figure 4:
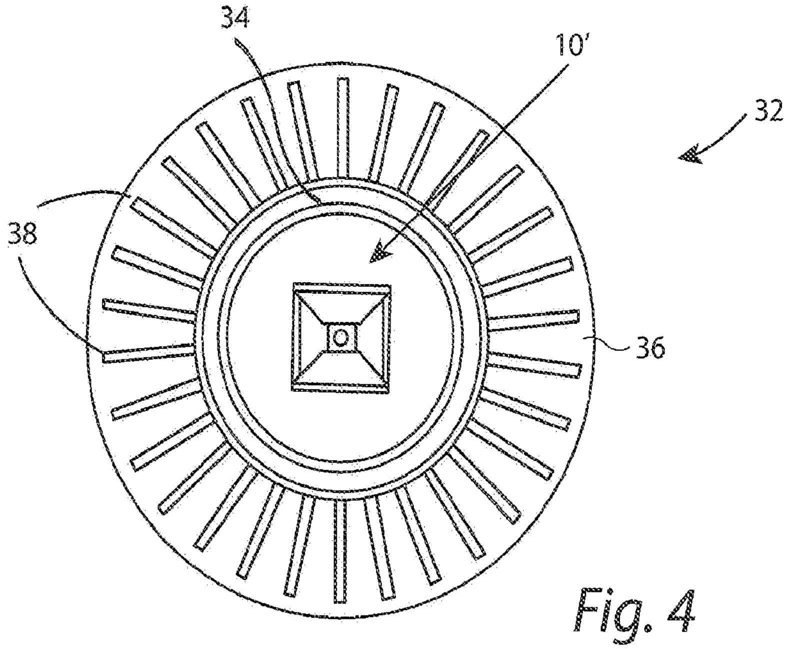
FIG. 4 is an end view a beam shaper.

FIG. 3 is a perspective view and FIG. 4 is an end view of a beam shaper 32 for the light source 10' of FIG. 2, where like reference numerals refer to like components, portions or elements. The beam shaper 32 is substantially cylindrical in shape and includes cylindrical opening 34 in an end plate 36 that is receptive to the glass envelope 12 of light source 10'. The end plate 36 supports a number of radial fins 38 and has an alignment slot 35. Ultraviolet light emitted by the light source 10' is shaped by the fins 38 to provide a desired distribution of UV light into the ambient environment. The alignment slot 35 ensures a fixed position and orientation of the beam shaper 32 with respect to the light source 10' inserted into opening 34 to provide consistent emission patterns for the UV light.

Figure 5:
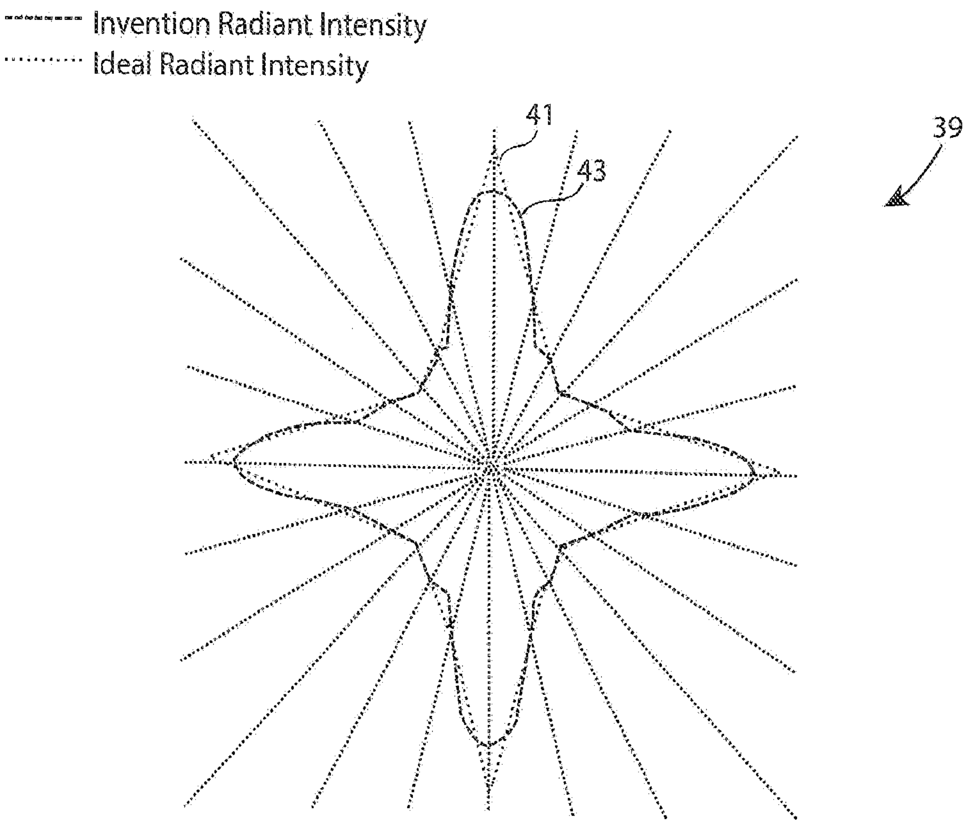
FIG. 5 is a first diagram illustrating an ideal and actual radiant intensity graph for illuminating the walls of a square room.

FIG. 5 is a diagram 39 illustrating an ideal radiant intensity graph 41 and an actual radiant intensity graph 43 of an example light source for illuminating the walls of a square room. The ideal radiant intensity is show in dotted lines while the actual radiant energy is shown in dashed lines.

Figure 6:
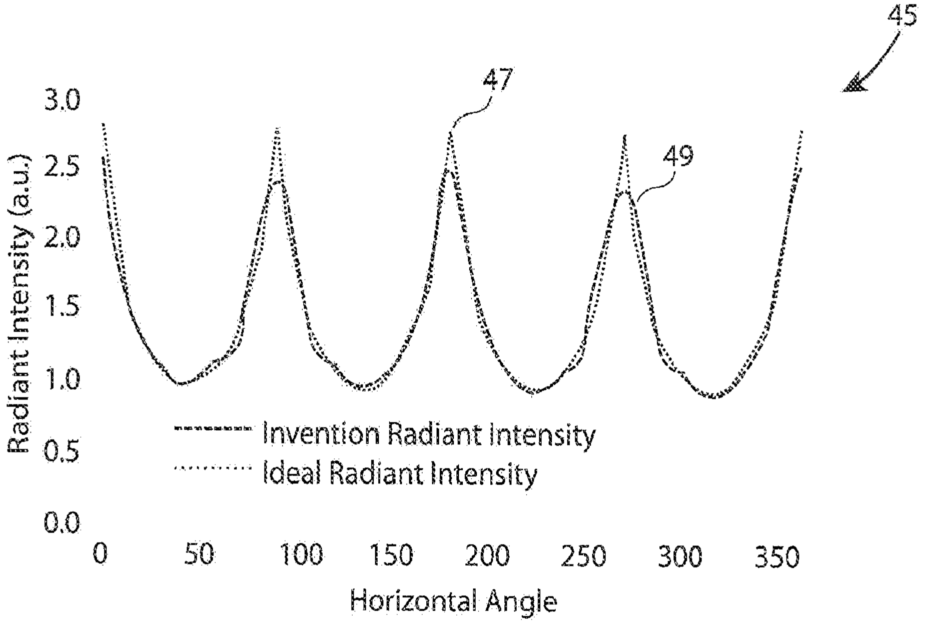
FIG. 6 is a second diagram illustrating an ideal and actual radiant intensity graph for illuminating the walls of a square room.

FIG. 6 is a second diagram 45 illustrating an ideal radiant intensity graph 47 and an actual radiant intensity graph 49 of the example light source for illuminating the walls of a square room. Again, the ideal radiant intensity is show in dotted lines while the actual radiant energy is shown in dashed lines.

Figure 7:
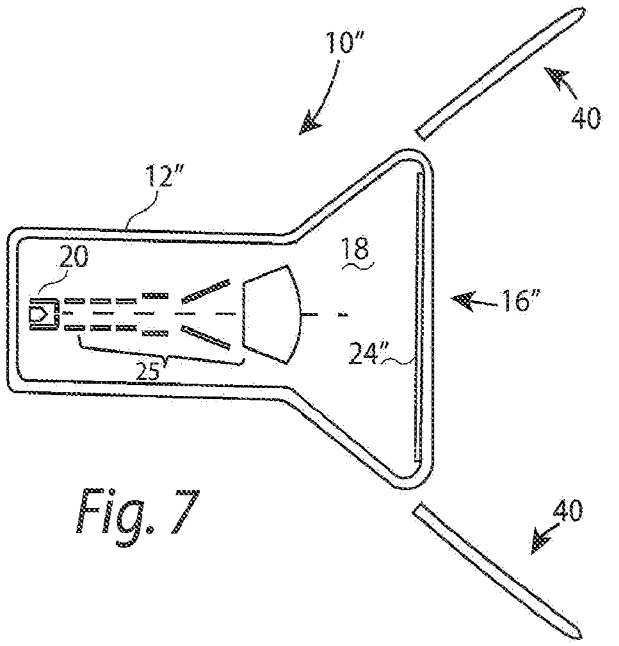
FIG. 7 is an illustration of a third example cathode-ray ultraviolet light source.

FIG. 7 is an illustration of a third example cathode-ray ultraviolet light source 10" which has a glass envelope 12" with an enlarged second end 16", where like reference numerals refer to like components, portions or elements. The target 24" includes, as in the previous embodiments, a target 24" having a phosphor material covered by a reflective metal film. This example further includes an external reflector 40 to help direct the UV light emanating from second end 16" of the light source. A combination of beam steering, variable focus and intensity control allows the beam angle to be controlled between about 5 degrees and 120+ degrees.

Figure 8:
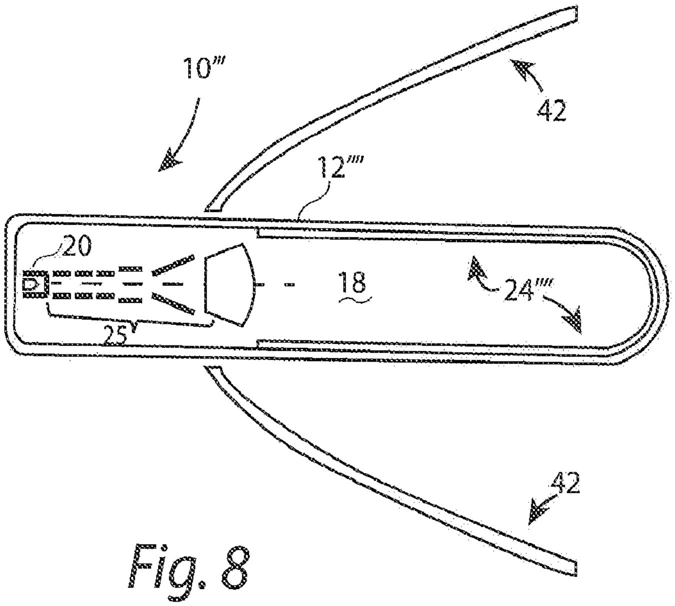
FIG. 8 is an illustration of a fourth example cathode-ray ultraviolet light source.

FIG. 8 is an illustration of a fourth example cathode-ray ultraviolet light source 10''' which has a target 24''' covering the internal side and end portions of a glass envelope 12''', where like reference numerals refer to like components, portions or elements. The target 24''' includes, as in the previous embodiments, a target 24''' having a phosphor material covered by a reflective metal film. This example further includes an external reflector 42 to help direct the UV light emanating from the light source. A combination of beam steering, variable focus and intensity control allows the beam angle to be controlled between about 5 degrees and 120+ degrees.

Figure 9:
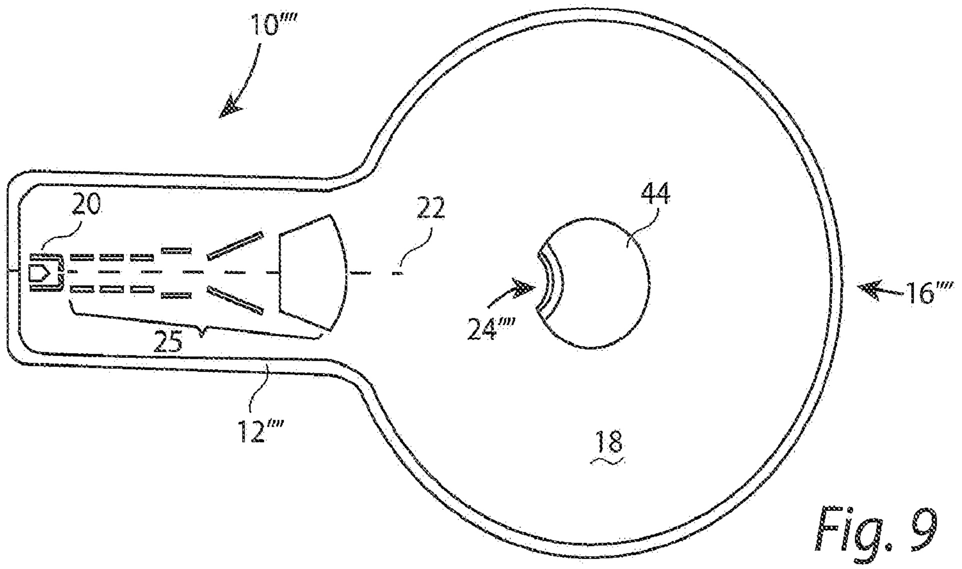
FIG. 9 is an illustration of a fifth example cathode-ray ultraviolet light source.

FIG. 9 is an illustration of a fifth example cathode-ray ultraviolet light source 10"" which has a glass envelope 12''' with a bulbous second end 16' where like reference numerals refer to like components, portions or elements. In this embodiment, a target 24''' is suspended within the evacuated volume 18 of the glass envelope by a UV light diffusion body 44. The target 24''' includes, as in the previous embodiments, a phosphor material covered by a reflective metal film and has a concave configuration with the metal film facing the electron beam 22. Ultraviolet light emitted from the phosphor of the target 24"" is diffused by the light diffusion body 24 to provide nearly 360° of light emission coverage.

Figure 10:
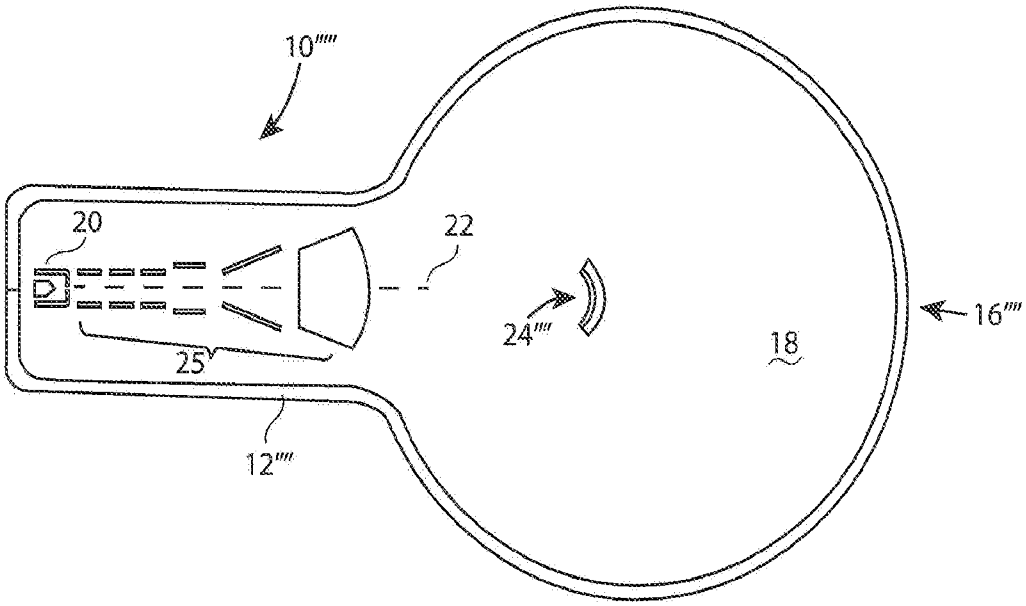
FIG. 10 is an illustration of a sixth example cathode-ray ultraviolet light source.

FIG. 10 is an illustration of a sixth example cathode-ray ultraviolet light source 10"'" which is essentially the same as the example of FIG. 9 with the exception that the light diffusion body 44 has been omitted, where like reference numerals refer to like components, portions or elements. In this example, the target 24"" directs UV light in a somewhat conical fashion from the second end 16"" of the light source.

Figure 11:
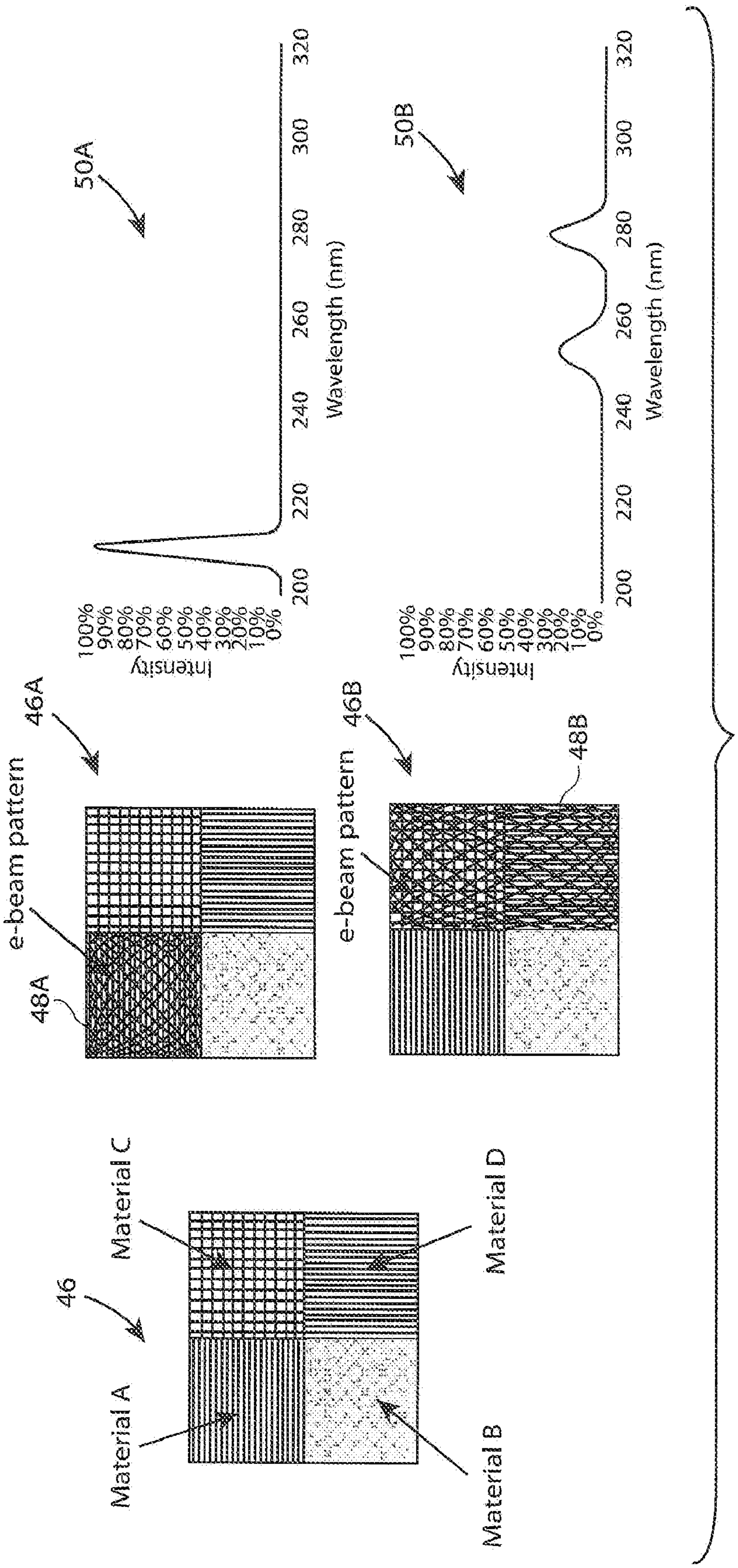
FIG. 11 illustrates a spectral tuning method for a cathode-ray tube ultraviolet light source using a plurality of phosphors.

FIG. 11 illustrates a spectral tuning method for a cathode-ray tube ultraviolet light source using a plurality of phosphors. In this example four different phosphors are laid out in a 2×2 grid 46 and comprise a Material A, Material B, Material C and Material D. As seen at 46A, a "spirograph" type pattern 48A over Material A produces an emission spectra 50A. As seen at 46B, a spirograph type pattern 48B over Material C and Material D produces a different emission spectra 50B.

The emission wavelength of a light source 10 is determined by the phosphor material being irradiated. For example, AlN is a material that can emit UVC light at 210 nm. As another example, AlGaN can emit at different (longer) wavelengths. For AlGaN, the amount of gallium will determine the emission wavelength which will increase with the amount of gallium added to the alloy. Furthermore, dopants can be added to AlN or AlGaN to change their emission wavelengths. As still another example, hexagonal boron nitride will emit UVC light in the range of 210-220 nm.

Other phosphor materials that emit UV light in the range of 190-280 nm include:

$LuF_3$:Nd
$Sr(Al,Mg)_{12}O_{19}$:Pr
$Ca_2Al_2SizO_7$:Pr
$YSiO_5$:Pr
$Lu_2SiO_5$:Pr
$Ca_2P_2O_7$: Pr
$LaPO_4$:Pr
$(Lu,Y,Sc)_3(Al,Ga)_5O_{12}$
$(Lu,Y,Sc)(Al,Ga)O_3$:Pr
$(Y,Lu)_3(Al,Ga)_5O_{12}$:La
$YBO_3$:Pr
$Sr_3Y_2Si_6O_{18}$:Pr

Since the human visual system is incapable of detecting light in with a wavelength less than about 360 nm, in some embodiments a phosphor material that emits in the wavelength range of about 450 nm to about 650 nm may be incorporated with a phosphor material that emits in the wavelength range of about 190 nm to about 280 n in order to provide a visual indication that the device is operating. It should be noted that while a preferred wavelength range for safety is 190-230 nm, for certain applications this range may be extended up to about 280 nm. Depending upon the sterilization target, some wavelengths <280 nm may be optimal, although special precautions are recommended outside of the optimal 190-230 nm range.

Preferred electron beam energy is 6,000 to 34,000 V. Beam current can range from 1 μA to 5 mA. Suitable spot sizes for certain applications is in the range of 0.1 to 1.0 mm in diameter. For some applications, a maximum spot size of up to about 5 mm in diameter may be desirable.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A cathode-ray ultraviolet light source comprising:

an elongated glass envelope having a first end and second end, the glass envelope defining an evacuated volume;

an electron gun positioned within the evacuated volume proximate to the first end and being capable of developing an electron beam;

a target disposed within the evacuated volume between the first and second end of the glass envelope, the target comprising a phosphor material including one or more of AlN, AlGaN and hexagonal boron nitride, and a reflective metal film at least partially covering the phosphor material; and an electron beam focusing and deflecting mechanism disposed within the evacuated volume between the electron gun and the target to steer an electron beam spot across the reflective metal film of the target to penetrate the metal film and to cause the phosphor material to emit ultraviolet (UV) light in the wavelength range of 190-280 nm, wherein a diameter of the spot is in the range of 0.1 to 5 mm.

2. A cathode-ray ultraviolet light source as recited in claim 1 wherein the target forms a coating on an inner wall portion of the glass envelope.

3. A cathode-ray ultraviolet light source as recited in claim 2 wherein the inner wall portion is at the second end of the glass envelope.

4. A cathode-ray ultraviolet light source as recited in claim 3 wherein the inner wall portion is also on a sidewall portion of the glass envelope.

5. A cathode-ray ultraviolet light source as recited in claim 1 wherein the target is suspended within the evacuated volume of the glass envelope.

6. A cathode-ray ultraviolet light source as recited in claim 5 wherein the target has a concave configuration with the reflective metal film facing the electron gun.

7. A cathode-ray ultraviolet light source as recited in claim 6 wherein, the target is part of a light diffusion body.

8. A cathode-ray ultraviolet light source as recited in claim 1 further comprising an exterior reflector coupled to the glass envelope to direct UV light emitted by the light source.

9. A cathode-ray ultraviolet light source as recited in claim 1 further comprising an exterior beam shaper coupled to the glass envelope to shape UV light emitted by the light source.

10. A cathode-ray ultraviolet light source as recited in claim 1 wherein the spot has a diameter in the range of 0.1 to 1.0 mm.

11. A method for operating a cathode-ray tube ultraviolet light source comprising:

steering an electron beam to create a moving spot having a diameter in the range of 0.1 to 5 mm on a reflective metal film covering a phosphor comprising one or more of AlN, AlGaN and hexagonal boron nitride in an evacuated glass envelope; and emitting ultraviolet (UV) light in the wavelength range of 190-280 nm from the phosphor through the glass envelope.

12. A method for operating a cathode-ray tube ultraviolet light source as recited in claim 11 further comprising focusing the electron beam into the spot.

13. A method for operating a cathode-ray tube ultraviolet light source as recited in claim 12 wherein the moving spot forms a pattern on the reflective metal film.

14. A method for operating a cathode-ray tube ultraviolet light source as recited in claim 13 wherein the phosphor is a first phosphor of a plurality of phosphors, and wherein the moving spot is steered in a pattern across the reflective metal film over one or more of the plurality of phosphors.

15. A method for operating a cathode-ray tube ultraviolet light source as recited in claim 14 wherein at least one of the plurality of phosphors other than the first phosphor comprise one or more of $LuF_3$:Nd; $Sr(Al,Mg)_{12}O_{19}$:Pr; $Ca_2AlSi_2O_7$: Pr; $YSiO_5$:Pr; $Lu_2SiO_5$:Pr; $Ca_2P_2O_7$:Pr; $LaPO_4$:Pr; $(Lu,Y,Sc)_3(Al,Ga)_5O_{12}$; $(Lu,Y,Se)(Al,Ga)O_3$: Pr; $(Y,Lu)_3(Al,Ga)_5O_{12}$: La; $YBO_3$:Pr; $Sr_3Y_2Si_6O_{18}$:Pr.

16. A method for operating a cathode-ray tube ultraviolet light source as recited in claim 11 wherein the spot size has a diameter in the range of 0.1 to 1.0 mm.

* * * * *